US011640762B2

(12) United States Patent
Choi et al.

(10) Patent No.: US 11,640,762 B2
(45) Date of Patent: May 2, 2023

(54) APPARATUS AND METHOD OF INDICATING EXPECTED SPEED OF VEHICLE

(71) Applicants: HYUNDAI MOTOR COMPANY, Seoul (KR); KIA CORPORATION, Seoul (KR)

(72) Inventors: Seok Hwan Choi, Seoul (KR); Ho Kyun Chun, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/376,948

(22) Filed: Jul. 15, 2021

(65) Prior Publication Data

US 2022/0114889 A1    Apr. 14, 2022

(30) Foreign Application Priority Data

Oct. 12, 2020    (KR) .................. 10-2020-0130951

(51) Int. Cl.
*G08G 1/0967*    (2006.01)
*B60K 35/00*    (2006.01)
*G08G 1/054*    (2006.01)

(52) U.S. Cl.
CPC ....... *G08G 1/096766* (2013.01); *B60K 35/00* (2013.01); *G08G 1/054* (2013.01);
(Continued)

(58) Field of Classification Search
CPC .. G08G 1/096766; G08G 1/054; B60K 35/00; B60K 2370/1529; B60K 2370/167;
(Continued)

(56) References Cited

U.S. PATENT DOCUMENTS 5,381,155 A * 1/1995 Gerber ............... G08G 1/054
340/936
8,032,273 B2 * 10/2011 Yang ................... G01C 21/26
701/32.4
(Continued)

FOREIGN PATENT DOCUMENTS

DE    102014213057 A1 * 1/2015 ............. B60K 35/00
DE    102017107216 A1 * 12/2017 ............. B60K 31/00
(Continued)

*Primary Examiner* — Chico A Foxx
(74) *Attorney, Agent, or Firm* — Morgan, Lewis & Bockius LLP

(57) ABSTRACT

An apparatus for indicating an expected speed of a vehicle includes an information provider configured to provide vehicle driving information and deceleration event information required to determine the expected speed of the vehicle at a deceleration event point while the vehicle travels, a controller configured to detect a deceleration event on a travel path based on the vehicle driving information and the deceleration event information provided by the information provider and to determine the expected speed of the vehicle at the detected deceleration event point, and a display unit configured to receive a signal indicating the expected speed of the vehicle at the deceleration event point and the deceleration event information from the controller and to display the received expected speed of the vehicle in a predetermined form of an augmented reality (AR) image and a position of the deceleration event on an information display screen.

20 Claims, 5 Drawing Sheets

(52) U.S. Cl.
CPC .............. *B60K 2370/1529* (2019.05); *B60K 2370/167* (2019.05); *B60K 2370/168* (2019.05); *B60K 2370/177* (2019.05); *B60K 2370/178* (2019.05); *B60K 2370/21* (2019.05)

(58) Field of Classification Search
CPC ........ B60K 2370/177; B60K 2370/168; B60K 2370/178; B60K 2370/21
See application file for complete search history.

(56) References Cited

U.S. PATENT DOCUMENTS

| | | | | |
|---|---|---|---|---|
| 9,855,949 | B2* | 1/2018 | Tomatsu | B60W 30/146 |
| 10,046,763 | B2* | 8/2018 | Inoue | B60W 50/00 |
| 10,272,780 | B2* | 4/2019 | Yoshida | B60K 35/00 |
| 2006/0290202 | A1* | 12/2006 | Shibata | B60T 7/22 |
| | | | | 303/165 |
| 2009/0157249 | A1* | 6/2009 | Yang | G08G 1/052 |
| | | | | 701/32.4 |
| 2009/0319095 | A1* | 12/2009 | Cech | B62D 15/029 |
| | | | | 701/1 |
| 2011/0187547 | A1* | 8/2011 | Kweon | G01C 21/3697 |
| | | | | 340/670 |
| 2015/0015457 | A1* | 1/2015 | Takasu | G02B 27/01 |
| | | | | 345/7 |
| 2015/0105993 | A1* | 4/2015 | Um | B60W 30/146 |
| | | | | 701/93 |
| 2016/0075234 | A1* | 3/2016 | Takamatsu | B60K 35/00 |
| | | | | 340/438 |
| 2016/0075235 | A1* | 3/2016 | Takamatsu | B60K 35/00 |
| | | | | 340/438 |
| 2016/0144713 | A1* | 5/2016 | Verheijen | G07C 5/0825 |
| | | | | 701/123 |
| 2017/0010117 | A1* | 1/2017 | Oh | G01C 21/3602 |
| 2017/0269363 | A1* | 9/2017 | Fujita | G02B 27/18 |
| 2018/0105040 | A1* | 4/2018 | Ryu | G08G 1/167 |
| 2018/0170348 | A1* | 6/2018 | Kim | B60W 50/0097 |
| 2018/0239971 | A1* | 8/2018 | Kim | G06V 20/58 |
| 2018/0297470 | A1* | 10/2018 | Kim | B60Q 1/085 |
| 2019/0061780 | A1* | 2/2019 | Han | G05D 1/0061 |
| 2019/0178669 | A1* | 6/2019 | Lee | G02B 27/0179 |
| 2019/0244553 | A1* | 8/2019 | Irzyk | G02B 27/0101 |
| 2020/0135025 | A1* | 4/2020 | Maeda | G08G 1/096783 |
| 2020/0349833 | A1* | 11/2020 | Lerner | G08G 1/0125 |
| 2022/0003997 | A1* | 1/2022 | Kusafuka | B60K 37/02 |
| 2022/0041070 | A1* | 2/2022 | Isami | B60K 20/00 |
| 2022/0055659 | A1* | 2/2022 | Zhang | B60K 35/00 |

FOREIGN PATENT DOCUMENTS

| | | | | |
|---|---|---|---|---|
| JP | 2006199264 | A | * 8/2006 | |
| JP | 2019081473 | A | * 5/2019 | |
| KR | 2195881 | B1 | * 12/2020 | B60K 35/00 |

* cited by examiner

APPARATUS AND METHOD OF INDICATING EXPECTED SPEED OF VEHICLE

CROSS-REFERENCE TO RELATED APPLICATION

This application claims priority to and the benefit of Korean Patent Application No. 10-2020-0130951, filed on Oct. 12, 2020, the entire contents of which are incorporated herein by reference.

TECHNICAL FIELD

The present disclosure relates to an apparatus and method of indicating an expected speed of a vehicle, and more particularly to an apparatus and method of indicating an expected speed of a vehicle for displaying expected vehicle speed information at a deceleration event point while the vehicle travels, through a display.

BACKGROUND

The statements in this section merely provide background information related to the present disclosure and may not constitute prior art.

Today, as various high technologies have been applied to vehicles, the mobility, the utility, the convenience, the safety, and the like have been remarkably improved. For example, a head-up display (HUD) unit for projecting information onto the eye of a driver in a vehicle has been increasingly used.

A HUD unit is a device for displaying a forward side on a windshield glass. First, a HUD unit is introduced to ensure a forward field of vision of a pilot in an airplane, but recently, has been applied to indicate driving information or other information also in a vehicle.

A HUD unit of a vehicle forms and displays a virtual image on a windshield glass to allow a driver to recognize information on a speed, a fuel level, a direction, a temperature, warning, or the like, which is displayed on an existing cluster. The HUD unit may provide a function of a night-vision to identify a forward object at night as well as existing cluster information.

When the HUD unit is used, the concentration of a driver with respect to a forward side is high, and thus risk of accidents may be reduced, and accidents that occur when the driver lowers the head in order to check cluster information while driving may be prevented. In addition, the HUD unit displays an image of information on an internal operation and driving information of the vehicle on a windshield glass to minimize eye movement of the driver and to prevent the driver from being distracted with respect to a forward side.

With regard to the configuration of a device, the HUD unit may include an image source such as a liquid crystal display (LCD) for generating an image, an optical system for forming the image that is generated from the image source and is projected, at an optimal distance and an effective focal distance of the windshield glass, and an interface for manipulation of a driver.

Recently, as augmented reality (AR) technology has been developed, research has been actively conducted to use the AR technology in the field of vehicles. For example, research has been conducted into an AR head-up display by applying the AR technology to a conventional head-up display.

In the case of a conventional head-up display, minimum information is displayed on the windshield glass of the vehicle in the range in which vehicle driving and a forward field of vision are not obstructed, thereby improving driving convenience. In contrast, the AR head-up display combines and displays information on a surrounding geographical feature seen on the windshield glass and information on the vehicle, thereby maximizing convenience.

In addition to the aforementioned function of the head-up display, a navigation-based smart cruise control (NSCC) function has been known as one of high technologies applied to a vehicle. The NSCC is a function of controlling a vehicle speed depending on a speed limit, a roadway radius of curvature, or the like using information on a map of a navigation device and also includes a function of reducing a speed according to the position of a speed limit camera.

When a speed limit camera is present ahead in a general driving situation, a driver drives a vehicle at a speed limit or less by manipulating an accelerator pedal and a brake pedal. However, the accelerator pedal and the brake pedal are manipulated based on sense of the driver, and thus there is a problem of excessive manipulation of the pedals, over deceleration, over speed, and the like.

In contrast, when the NSCC function is used, if a speed limit camera is present ahead, a vehicle autonomously controls a speed, and thus the above problem of excessive manipulation of the pedals, over deceleration, over speed, and the like may be overcome. However, the vehicle autonomously controls a speed while the NSCC function is used, but the driver is not capable of receiving any information other than a notification of a NSCC operation, and thus the driver may always be nervous.

SUMMARY

In one aspect, the present disclosure provides an apparatus and method of indicating an expected speed of a vehicle for calculating an expected vehicle speed at a deceleration event point using information collected from the vehicle while driving when a deceleration event such as a speed limit camera is present ahead of the vehicle and displaying the result through a display.

The technical problems solved by some forms of the present disclosure are not limited to the above technical problems and other technical problems which are not described herein will become apparent to those skilled in the art from the following description.

In one form of the present disclosure, an apparatus for indicating an expected speed of a vehicle includes an information provider configured to provide vehicle driving information and deceleration event information required to determine the expected speed of the vehicle at a deceleration event point while the vehicle travels, a controller configured to detect a deceleration event on a travel path based on the vehicle driving information and the deceleration event information provided by the information provider and to determine the expected speed of the vehicle at the detected deceleration event point, and a display unit configured to receive a signal indicating the expected speed of the vehicle at the deceleration event point along with the deceleration event information from the controller and to display the received expected speed of the vehicle in a predetermined form of an augmented reality (AR) image along with a position of the deceleration event on an information display screen.

In another form of the present disclosure, a method of indicating an expected speed of a vehicle includes receiving vehicle driving information and deceleration event information required to determine the expected speed of the vehicle at a deceleration event point while the vehicle travels, from an information provider, by a controller, detecting a deceleration event on a travel path based on the vehicle driving information and the deceleration event information provided by the information provider and determining the expected speed of the vehicle at the detected deceleration event point, by the controller, and receiving a signal indicating the expected speed of the vehicle at the deceleration event point along with the deceleration event information from the controller and displaying the received expected speed of the vehicle in a predetermined form of an augmented reality (AR) image along with a position of the deceleration event on an information screen, by a display unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The above and other features of the present disclosure will now be described in detail with reference to certain exemplary forms thereof illustrated in the accompanying drawings which are given hereinbelow by way of illustration only, and thus are not limitative of the present disclosure, and wherein.

Figure 1:
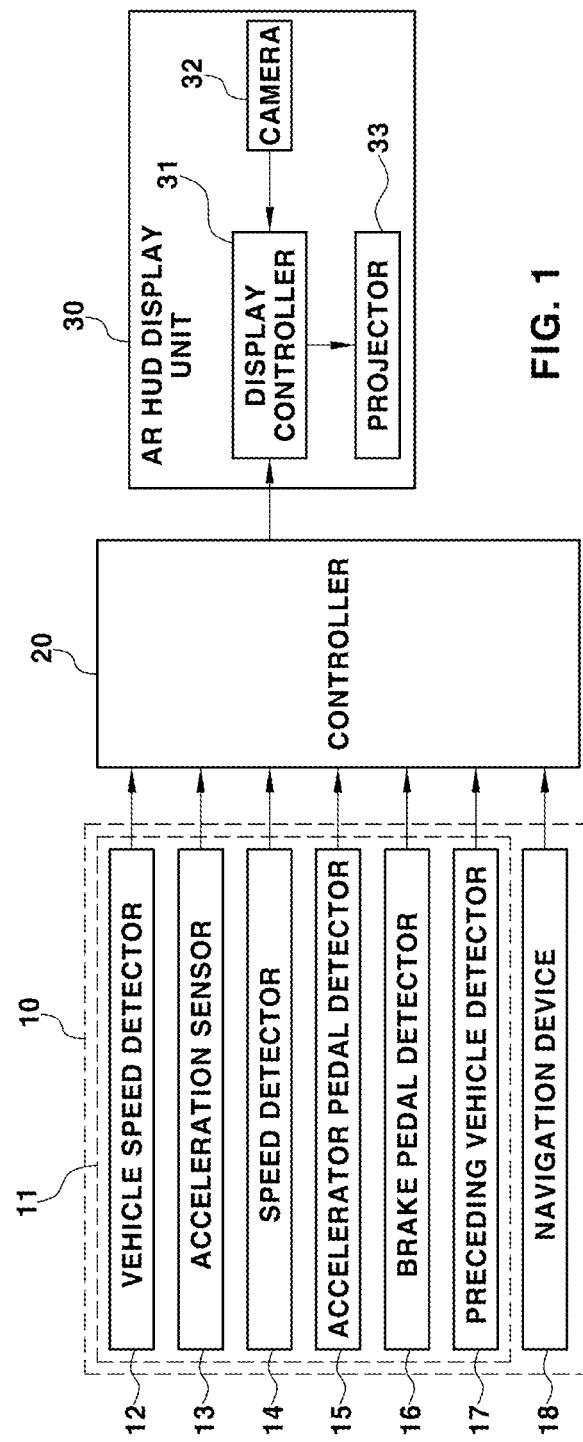
FIG. 1 is a block diagram showing the configuration of an apparatus for indicating an expected speed of a vehicle in some forms of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Particular structural and functional descriptions of some forms of the present disclosure are only for the purpose of describing particular forms of the present disclosure. The forms of the present disclosure are formed in many different forms and should not be construed as being limited to the forms set forth herein, and it is to be appreciated that all changes, equivalents, and substitutes that do not depart from the spirit and technical scope of the present disclosure are encompassed in the present disclosure.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

Throughout this specification, the same reference numerals in the drawings denote the same element. The terms used herein are for the purpose of describing some forms of the present disclosure only and are not intended to be limiting form of the present disclosure. Throughout this specification, the singular expressions in the present specification include the plural expressions unless clearly specified otherwise in context. Throughout this specification, the terms such as "include" or "comprise" may be construed to denote a constituent element, a step, an operation, and/or a device, but may not be construed to exclude the existence of a possibility of addition of one or more constituent elements, steps, operations, and/or a device.

Reference will now be made in detail, examples of which are illustrated in the accompanying drawings.

The present disclosure may provide an apparatus and method of indicating an expected speed of a vehicle for calculating an expected vehicle speed at a deceleration event point using information collected from the vehicle while driving when a deceleration event such as a speed limit camera is present ahead of the vehicle and displaying the result through a display. Here, the display may be a head-up display.

That is, according to the present disclosure, the expected vehicle speed at the forward deceleration event point may be displayed (represented) and indicated using a display unit, and in this case the display unit may be a head-up display (HUD) unit. In more detail, the display unit may be an AR HUD unit for displaying the expected vehicle speed in the form of an image of augmented reality (AR) on an information display screen. Herein, the information display screen in a vehicle may be a windshield glass, a navigation display screen, or a screen of a head-up display (HUD) unit separately mounted.

FIG. 1 is a block diagram showing the configuration of an apparatus for indicating an expected speed of a vehicle in some forms of the present disclosure.

As shown in the drawing, the apparatus for indicating an expected speed of a vehicle in some forms of the present disclosure may include an information provider 10 for providing information for determining the expected speed of the vehicle at a deceleration event positioned ahead of the vehicle, a controller 20 for calculating and determining the expected speed of the vehicle at the deceleration event based on the information provided from the information provider 10, and a display unit 30 for receiving a signal indicating the determined expected speed of the vehicle from the controller 20 and displaying the expected speed of the vehicle at the deceleration event in a predetermined form of an AR image on the windshield glass.

Here, the information provider 10 may include a driving information detector 11 for detecting and providing vehicle driving information, and a navigation device 18 for providing deceleration event information on a forward side of the vehicle on a travel path. In a vehicle having the apparatus for indicating an expected speed, the driving information detector 11 may detect vehicle driving information required to predict a vehicle speed at the deceleration event point while the vehicle travels.

In some forms of the present disclosure, the vehicle driving information detected by the driving information detector 11 may include vehicle speed and vehicle acceleration and deceleration information. In this case, the driving information detector 11 may include a vehicle speed detector 12 for detecting a speed (vehicle speed) at which the vehicle travels in real time. In some forms of the present disclosure, the real-time driving vehicle speed detected by the vehicle speed detector 12 may be used to acquire information acceleration and deceleration of the vehicle. That is, the controller 20 may acquire the information acceleration and deceleration of the vehicle by differentiating a vehicle speed signal received from the vehicle speed detector 12.

Thus, the controller 20 may predict the speed at the deceleration event point ahead of the vehicle using the vehicle speed information and the vehicle acceleration and deceleration information acquired through the vehicle speed detector 12. Calculation and determination of the expected speed of the vehicle at the deceleration event point by the controller 20 will be described below.

In some forms of the present disclosure, the vehicle speed detector 12 may include a wheel speed sensor. That is, a signal of the wheel speed sensor for detecting a rotation speed (hereinafter, referred to as the 'wheel speed') of the driving wheel may be used to detect the vehicle speed in real time, and the signal of the wheel speed sensor may be post-processed to acquire the real-time speed vehicle information, as is well known. In addition, the vehicle acceleration and deceleration may be acquired by differentiating the vehicle speed signal acquired by post-processing the signal of the wheel speed sensor.

In some forms of the present disclosure, the vehicle acceleration and deceleration information may be acquired through an acceleration sensor 13 that is actually installed in the vehicle rather than being acquired by differentiating the vehicle speed signal. In this case, the driving information detector 11 may include the acceleration sensor 13 for detecting longitudinal acceleration of the vehicle along with the vehicle speed detector 12, in which case the acceleration sensor 13 may be a G-sensor installed in the vehicle. The G-sensor may acquire negative (−) deceleration information as well as positive (+) acceleration information.

The vehicle acceleration and deceleration information may also be acquired by post-processing a speed signal of a driving system of the vehicle. Here, the driving system speed may be a rotation speed (hereinafter, referred to as an 'engine speed') of an engine that is a driving device for driving the vehicle or a rotation speed (hereinafter, referred to as a 'motor speed') of a driving motor that is the driving device for driving the vehicle.

In this case, the driving information detector 11 may include a speed detector 14 for detecting a vehicle driving system speed. Here, the speed detector 14 may be an engine revolution per minute (RPM) sensor included in an engine vehicle or may be a resolver installed in a driving motor in an electric vehicle.

For example, a vehicle speed may be acquired using a motor speed and a longitudinal deceleration gear ratio that are detected by the resolver in the electric vehicle and acceleration and deceleration information may be acquired by differentiating the vehicle speed. Alternatively, the vehicle speed may be acquired using information on information on the engine speed detected by the engine RPM sensor and a gear ratio (a transmission gear ratio and a longitudinal deceleration gear ratio) to a driving wheel from an engine, and acceleration and deceleration information may be acquired by differentiating the vehicle speed.

The acceleration and deceleration of the vehicle may be calculated based on torque of a driving device (driving torque and regenerative torque) or the like, in which case the torque may be a torque command (an engine torque command, a motor driving torque command, or a motor regenerative torque command) for the driving device. This may be determined based on the vehicle driving information by the controller 20, and it is well known that the driving torque command, the regenerative torque command, and the like may be determined based on the vehicle driving information by the controller 20, and thus a detailed description thereof will be omitted in the specification.

In some forms of the present disclosure, the driving information detector 11 of the information provider 10 may include the vehicle speed detector 12 in order to determine the driving state of the vehicle by the controller 20 as well as to acquire the vehicle acceleration and deceleration information, and may further include a driving input detector for detecting driving input information of the driver and a preceding vehicle detector 17 for detecting information on a preceding vehicle.

The driving input detector may detect driving input information that is input as the drives performs manipulation for driving while the vehicle travels, and may include a detector for detecting a driver pedal input value, that is, an accelerator pedal detector 15 for detecting an acceleration pedal input value (APS value) of the driver, and a brake pedal detector 16 for detecting a brake pedal input value (BPS value) of the driver. The accelerator pedal detector 15 may be an accelerator position sensor (APS) that is generally include in a vehicle, and the brake pedal detector 16 may be a brake pedal position sensor (BPS).

According to the present disclosure, the preceding vehicle detector 17 may include an in-vehicle sensor for detecting information on a preceding vehicle (a preceding vehicle in the same lane) that travels ahead of a vehicle for which an expected speed is indicated. In detail, the preceding vehicle detector 17 may include a radio detection and ranging (RADAR) sensor or a laser detection and ranging (LADAR) sensor installed in the vehicle. The preceding vehicle information acquired by the preceding vehicle detector 17 may include information on a relative distance between an ego-vehicle for which an expected speed is indicated and the preceding vehicle or information on a relative speed therebetween.

Thus, in some forms of the present disclosure, the vehicle driving information detected by the driving information detector 11 may further include an accelerator pedal input value, a brake pedal input value, and preceding vehicle information as well as the vehicle speed and the acceleration and deceleration information.

The navigation device 18 may provide the deceleration event information of the forward side of the vehicle along with the current position information while the vehicle travels in the state in which a driver sets a destination and a travel path to the destination is generated. Here, the deceleration event information may include position information of a speed limit section and a speed limit camera ahead of the vehicle on the travel path, a prescribed speed limit, and the remaining distance information to the position of the deceleration event (the speed limit section, the speed limit camera, or the like) from the current vehicle position.

The controller 20 may determine the expected speed of the vehicle at the deceleration event point based on the vehicle driving information detected by the driving information detector 11 and the deceleration event information provided by the navigation device 18, and may perform control for indicating the expected speed of the vehicle. Here, the deceleration event may be the deceleration event with a prescribed speed limit, that is, a speed limit section or a speed limit camera present on a travel path, as described above. There among, the position of the speed limit section in which the expected speed of the vehicle is acquired may be a position at which a section start sign indicating section start is installed.

Figure 2:
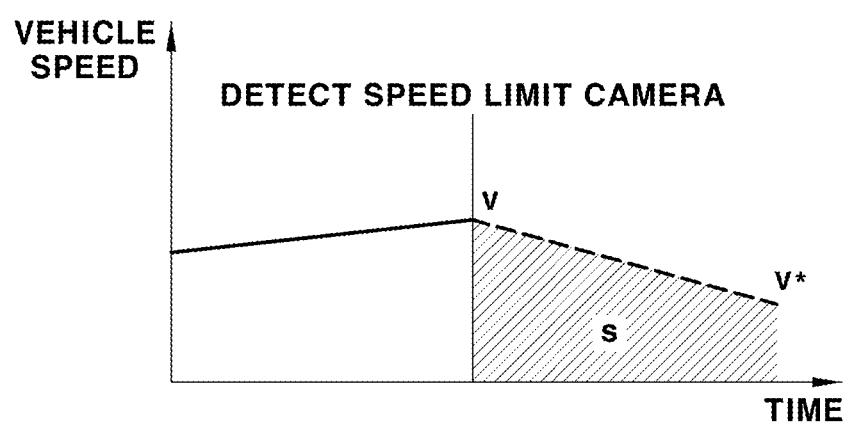
FIG. 2 is a diagram for explaining a method of determining an expected speed of a vehicle in some forms of the present disclosure.

FIG. 2 is a diagram for explaining a method of determining an expected speed of a vehicle in some forms of the present disclosure, and the controller 20 may determine the expected speed of the vehicle using vehicle speed information and vehicle acceleration and deceleration information that are acquired by the driving information detector 11, and the remaining distance information to the position of the deceleration event (the speed limit section, the speed limit camera, or the like) provided by the navigation device 18 according to Equation (1) below.

$$v^* = \sqrt{v^2 + 2as} \quad (1)$$

Here, v* is the expected speed of the vehicle at a deceleration event point, v is a real-time vehicle speed (an actual vehicle speed) detected while the vehicle travels after detecting the deceleration event, a is acceleration and deceleration of the vehicle, and s is the remaining distance (which is the updated remaining distance) to the forward deceleration event point from the current vehicle position.

In some forms of the present disclosure, the controller 20 may receive the remaining distance information to the position of the speed limit section or the speed limit camera with the prescribed speed limit from the navigation device 18 and the prescribed speed limit information, and calculate the actual vehicle speed and the vehicle moving distance (which is an integrated speed value s in FIG. 2) to update the remaining distance at a time of receiving the remaining distance.

In this case, after the vehicle detects the deceleration event, the controller 20 may continuously update the remaining distance while the vehicle travels towards the deceleration event point. Here, the updated remaining distance may be obtained by subtracting the vehicle moving distance from the remaining distance that is first received after the deceleration event is detected. As such, the remaining distance that is updated in real time may be the remaining distance s used to calculate the expected speed of the vehicle in Equation (1) above.

Then, in some forms of the present disclosure, the display unit 30 may indicate the expected vehicle speed at the deceleration event point, that is, the expected speed of the vehicle that is determined in real time by the controller 20 and may indicate the driver therethrough. The display unit 30 may be a HUD unit. In more detail, the display unit 30 may be an AR HUD unit for displaying the expected speed of the vehicle in the form of an AR image on a windshield glass.

In some forms of the present disclosure, the display unit 30 may include a display controller 31 for receiving a signal indicating the position of the deceleration event, a prescribed speed limit, and the expected speed of the vehicle at the deceleration event point, from the controller 20, and performing a series of control for displaying the signal in the form of an AR image, a camera 32 for capturing an image of a forward side of the vehicle, and a projector 33 for displaying the AR image indicating the position of the deceleration event and the expected speed of the vehicle on the windshield glass using the captured image information.

In the configuration, the display controller 31 may receive a signal of the captured image of the forward side of the vehicle, from the camera 32, may identity the forward deceleration event such as the section start sign of the speed limit section or the speed limit camera from the captured image of the forward side of the vehicle, and may determine the position of the forward deceleration event. In addition, the display controller 31 may determine a region of a road, in which the vehicle is to be positioned when the vehicle reaches the forward deceleration event point from the image of the forward side of the vehicle, based on the determined position of the forward deceleration event.

The display controller 31 may transfer the AR image indicating the position of the forward deceleration event, the region of the road in which the vehicle is positioned, and the expected speed of the vehicle, to the projector 33, using the image captured by the camera 32, and may simultaneously transfer a command signal indicating emission of the AR image to the windshield glass, to the projector 33.

Thus, the AR image indicating the position of the forward deceleration event, the region of the road in which the vehicle is positioned from the forward deceleration event point, and the expected speed of the vehicle at the forward deceleration event point may be displayed through the windshield glass, and thus the driver may be visually indicated through the expected speed of the vehicle.

As such, according to the present disclosure, when a deceleration event (e.g., a speed limit camera or a speed limit sign of a speed limit section) with a prescribed speed limit is present ahead of the vehicle, the expected vehicle speed at the deceleration event point may be calculated using information collected from a traveling vehicle, and the result may be displayed in the form of an augmented reality (AR) image on an in-vehicle display (e.g., a head-up display) to visually indicate the driver therethrough.

Thus, driver's anxiety about failure to comply with speed limit when the vehicle passes the deceleration event point may be overcome, and the certainty for speed limit compliance at the deceleration event point may be provided to the driver.

When the apparatus and method of indicating an expected speed of a vehicle according to the present disclosure are used, if a navigation-based smart cruise control (NSCC) function is used, worry and anxiety about failure to comply with speed limit that a driver experiences when a speed limit camera is present ahead the vehicle may be overcome.

Figure 3:
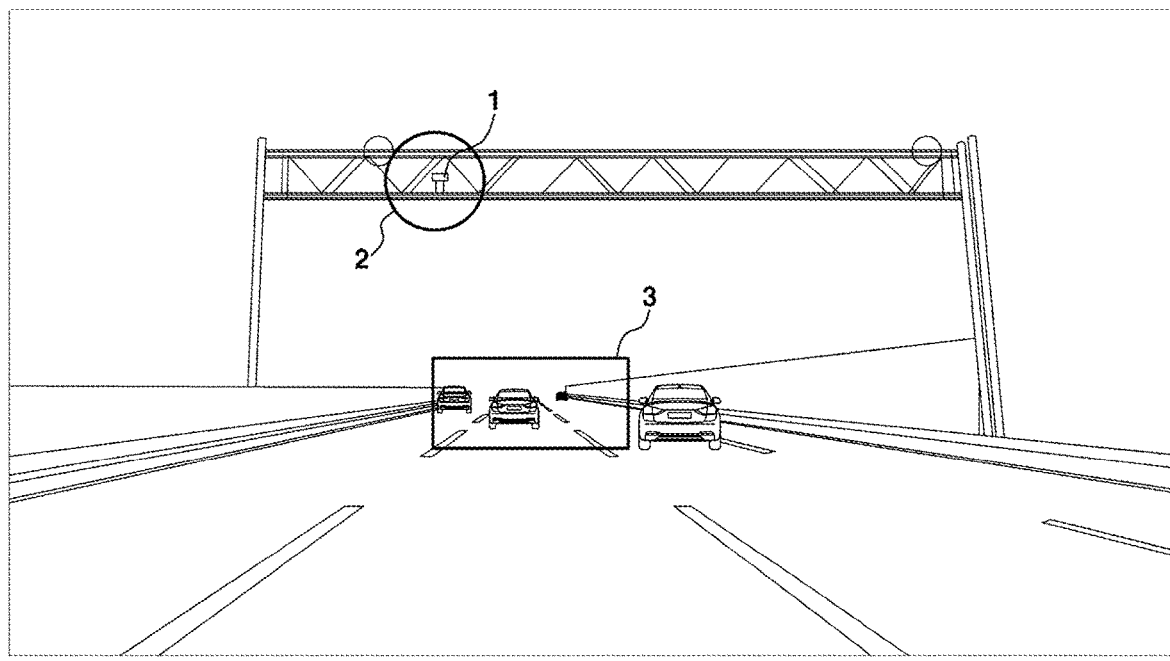
FIG. 3 is a diagram showing an example of the case in which the position of a speed limit camera and a region of a vehicle are indicated on an image captured by a camera in some forms of the present disclosure.
Figure 4:
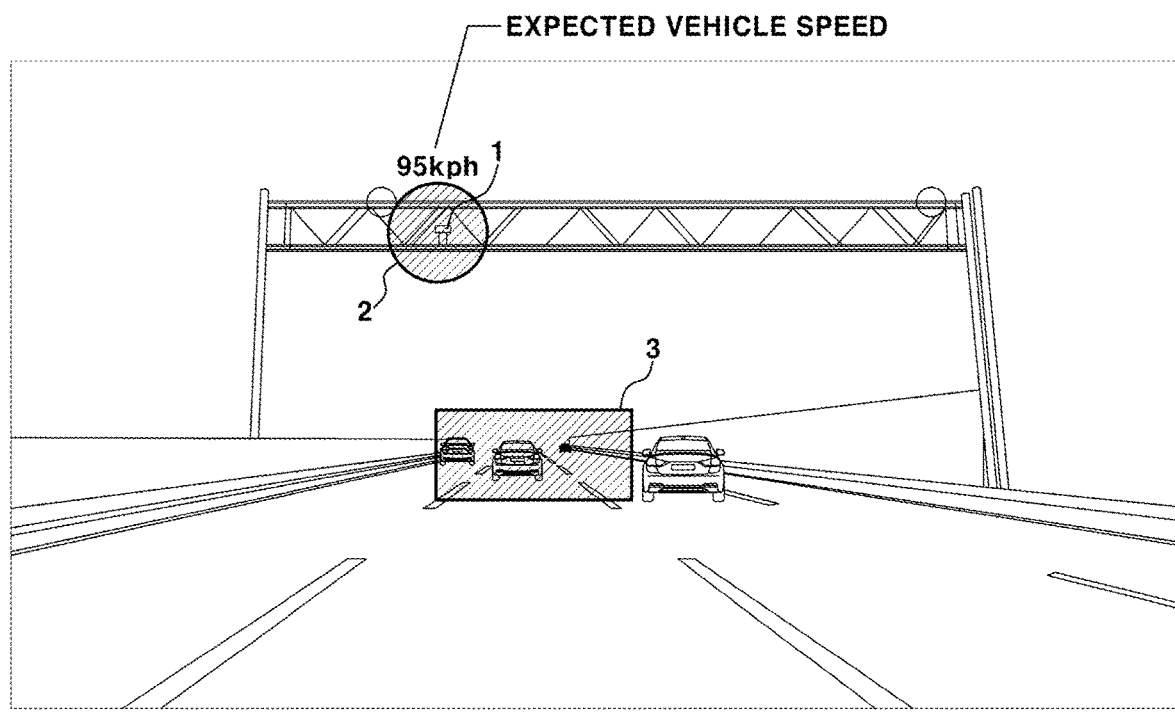
FIG. 4 is a diagram showing an example of the state in which an image is displayed when over speed is predicted in some forms of the present disclosure.

FIG. 3 is a diagram showing an example of the case in which the position of a speed limit camera and a region of a vehicle are indicated on an image captured by the camera 32 when a vehicle reaches the position of the speed limit camera in some forms of the present disclosure. FIG. 4 is a diagram showing an example of the state in which an image is displayed when over speed is predicted in some forms of the present disclosure.

In some forms of the present disclosure, when detecting the speed limit camera, the apparatus for indicating an expected speed of a vehicle may display an AR image indicating the position of a speed limit camera 1 through a windshield glass to indicate a driver therethrough, as shown in FIG. 3. As seen from FIG. 3, the position of the speed limit camera may be indicated as a circle 2 in an image, and a region 3 of a road, in which the vehicle is to be positioned below the speed limit camera, may be indicated as a square.

When comparing the expected speed of the vehicle with the speed limit and predicting over speed at the forward deceleration event (the speed limit camera), the display controller 31 may warn the driver by providing an effect of changing an indicated color of the deceleration event (the speed limit camera) and the vehicle region on the road to setting color or blinking an indicated portion, as shown in FIG. 4.

For example, when a vehicle travels at a speed of 100 km/h on a road with a speed limit of 80 km/h and then receives information on the speed limit camera 500 m ahead the speed limit camera to decelerate the vehicle, if the expected speed of the vehicle at the position of a speed limit camera after 500 m, the vehicle may be predicted to be in an over speed state at the position of the speed limit camera. In this case, as shown in FIG. 4, the driver may be warned by providing an effect of changing indicated color of the speed limit camera and the region of the vehicle on the road or blinking the indicated portion.

In contrast, when the expected speed of the vehicle at the position of the speed limit camera 100 m ahead the speed limit camera after a vehicle appropriately decelerates while moving towards the speed limit camera in the same situation is calculated again as 80 km/h, the current state may not be predicted as an over speed state, and the predicted over speed state is released, and thus control for the aforementioned operation of displaying a warning may not be performed.

Figure 5:
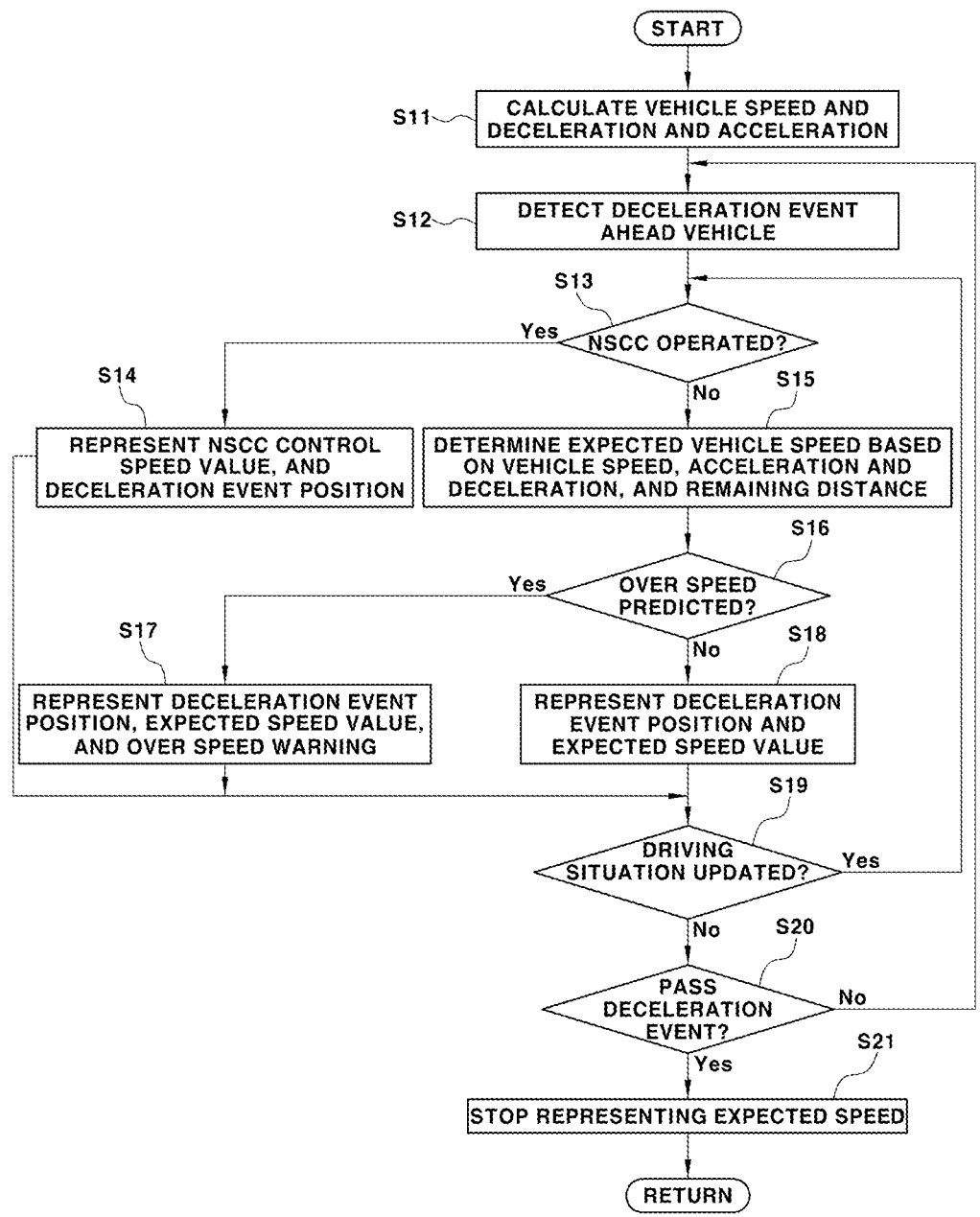
FIG. 5 is a flowchart showing an operation of indicating an expected speed of a vehicle in some forms of the present disclosure.

Hereinafter, a method of indicating an expected speed of a vehicle in some forms of the present disclosure will be described with reference to FIG. 5.

First, while the vehicle travels, the controller 20 may acquire vehicle speed and vehicle acceleration and deceleration information in real time through the driving information detector 11 (S11).

Then, when detecting a deceleration event ahead of the vehicle on a travel path from the deceleration event information provided by the navigation device 18 (S12), the controller 20 may determine whether the current NSCC function is being operated (S13).

Here, when determining that the NSCC function is capable of being operated, the controller 20 may transfer an NSCC control speed and deceleration event (speed limit camera) information to the display unit 30 and may display the NSCC control speed and the position of the deceleration event (S14).

In contrast, when determining that the NSCC function is not being operated, the controller 20 may determine the expected speed of the vehicle at the deceleration event based on the vehicle speed, acceleration and deceleration, and the remaining distance information to the deceleration event, received from the navigation device 18 (S15).

Then, the controller 20 may transfer a signal indicating the expected speed of the vehicle at the determined deceleration event along with the deceleration event information such as the detected position and type of the deceleration event, or a prescribed speed limit, to the display controller 31 of the display unit 30.

Thus, the display controller 31 may compare the expected speed of the vehicle at the deceleration event with the prescribed speed limit at the deceleration event and may determine whether an over speed state at the deceleration event is predicted (S16).

Here, when determining that the over speed state is predicted, the display controller 31 may perform control for representing the over speed state while the position of the deceleration event and the expected speed of the vehicle are represented (displayed) on the windshield glass (S17).

In contrast, when determining that the current state is not the over speed state, the display controller 31 may perform control for representing the position of the deceleration event and the expected speed of the vehicle on the windshield glass (S18), and in this case, control for representing the over speed state may not be performed.

Then, when updating a driving situation such as the remaining distance to the deceleration event in real time using collected information (operation S19), the controller 20 may repeatedly perform operations S13 to S19 until the vehicle passes the deceleration event.

Then, when determining that the vehicle passes the deceleration event, the controller 20 may stop an operation of displaying the expected speed of the vehicle through the display unit 30 and control thereof (S20 and S21).

Thus, the apparatus and method of indicating an expected speed of a vehicle according to the present disclosure may calculate the expected vehicle speed at the deceleration event point when a deceleration event (e.g., a speed limit camera or a speed limit section) with a prescribed speed limit is present ahead the vehicle using information collected from the vehicle while the vehicle travels, and may display the result in the form of an augmented reality (AR) image on a windshield glass to visually indicate the driver.

Thus, driver's anxiety about failure to comply with speed limit when the vehicle passes the deceleration event point may be overcome, and the certainty for speed limit compliance at the deceleration event point may be provided to the driver.

When the apparatus and method of indicating an expected speed of a vehicle according to the present disclosure are used, if a navigation-based smart cruise control (NSCC) function is used, worry and anxiety about failure to comply with speed limit that a driver experiences when a speed limit camera is present ahead the vehicle may be overcome.

The present disclosure has been described in detail with reference to some forms of the present disclosure. However, it will be appreciated by those skilled in the art that changes may be made in these forms without departing from the principles and spirit of the present disclosure, the scope of which is defined in the appended claims and their equivalents.

What is claimed is:

1. An apparatus for indicating an expected speed of a vehicle, the apparatus comprising:
   an information provider configured to provide vehicle driving information and deceleration event information required to determine the expected speed of the vehicle at a deceleration event point while the vehicle travels;
   a controller configured to:
   detect a deceleration event on a travel path based on the vehicle driving information and the deceleration event information; and determine the expected speed of the vehicle at the detected deceleration event point, in a state where a remaining distance to the deceleration event point from a current position of the vehicle remains while the vehicle travels towards the deceleration event point after the vehicle detects the deceleration event; and a display unit configured to:
receive a signal indicating the expected speed of the vehicle at the deceleration event point and the deceleration event information from the controller; and
display the received expected speed of the vehicle in a predetermined form of an augmented reality (AR) image and a position of the deceleration event on an information display screen.

2. The apparatus of claim 1, wherein the information provider further comprises:
a driving information detector configured to detect and provide the vehicle driving information; and
a navigation device configured to provide the deceleration event information of a forward side of the vehicle on the travel path.

3. The apparatus of claim 2, wherein:
the vehicle driving information comprises vehicle speed, and vehicle acceleration and deceleration, and
the deceleration event information comprises the position of the deceleration event, a prescribed speed limit, and the remaining distance to the deceleration event from the current position of the vehicle.

4. The apparatus of claim 3, wherein the controller is configured to:
determine the expected speed of the vehicle at the deceleration event point using information on a real-time vehicle speed and vehicle acceleration and deceleration, and the remaining distance information while the vehicle travels towards the deceleration event after the deceleration event is detected.

5. The apparatus of claim 4, wherein the controller is configured to:
calculate the expected speed of the vehicle at the deceleration event point based on the vehicle speed 'v', vehicle acceleration and deceleration 'a', and the remaining distance 's' using Equation E1 below:

$$v^* = \sqrt{v^2 + 2as} \qquad (E1).$$

6. The apparatus of claim 1, wherein the display unit further comprises:
a camera configured to capture an image of a forward view of the vehicle;
a display controller configured to display the expected speed of the vehicle in the form of the augmented reality (AR) image; and
a projector configured to display the AR image indicating the position of the deceleration event and the expected speed of the vehicle on the information display screen using information on the image of the forward side of the vehicle according to a command signal of the display controller.

7. The apparatus of claim 6, wherein the display controller is configured to:
identify the deceleration event from the image of the forward view of the vehicle;
determine the position of the deceleration event;
determine a region of a road, in which the vehicle is to be positioned when the vehicle reaches a forward deceleration event point from the image of the forward view of the vehicle, based on the determined position of the forward deceleration event; and
display the determined region of the road of the vehicle on the information display screen through the projector.

8. The apparatus of claim 6, wherein the display controller is configured to:
display a warning on the information display screen through the projector when the expected speed of the vehicle at the deceleration event point is compared with a speed limit of the deceleration event information and speed of the vehicle at the deceleration event point is predicted.

9. The apparatus of claim 1, wherein the deceleration event point is a section of a road where a speed limit camera is installed or a speed limit is set.

10. A method of indicating an expected speed of a vehicle, the method comprising:
receiving, by a controller, vehicle driving information and deceleration event information required to determine the expected speed of the vehicle at a deceleration event point while the vehicle travels, from an information provider;
detecting, by the controller, a deceleration event on a travel path based on the vehicle driving information and the deceleration event information provided by the information provider;
determining the expected speed of the vehicle at the detected deceleration event point, in a state where a remaining distance to the deceleration event point from a current position of the vehicle remains while the vehicle travels towards the deceleration event point after the vehicle detects the deceleration event;
receiving, by a display unit, a signal indicating the expected speed of the vehicle at the deceleration event point and the deceleration event information from the controller; and
displaying the received expected speed of the vehicle in a predetermined form of an augmented reality (AR) image and a position of the deceleration event on an information display screen.

11. The method of claim 10 further comprising:
detecting and providing, by a driving information detector, the vehicle driving information; and
providing, by a navigation device, the deceleration event information of a forward side of the vehicle on the travel path.

12. The method of claim 11, wherein:
the vehicle driving information comprises a vehicle speed and vehicle acceleration and deceleration, and
the deceleration event information comprises a position of the deceleration event, a prescribed speed limit, and the remaining distance to the deceleration event from the current position of the vehicle.

13. The method of claim 12, further comprising:
determining, by the controller, the expected speed of the vehicle at the deceleration event point using information on a real-time vehicle speed and vehicle acceleration and deceleration, and the remaining distance information while the vehicle travels towards the deceleration event after the deceleration event is detected.

14. The method of claim 13, further comprising:
updating, by the controller, the remaining distance using a vehicle speed at a time of receiving the remaining distance information from the navigation device and a vehicle moving distance calculated by integrating the vehicle speed; and using the updated remaining distance information to determine the expected speed of the vehicle at the deceleration event point.

15. The method of claim 13, further comprising:
calculating, by the controller, the expected speed of the vehicle at the deceleration event point based on the vehicle speed 'v', vehicle acceleration and deceleration 'a', and the remaining distance 's' using Equation E1 below:

$$v^* = \sqrt{v^2 + 2as} \quad \text{(E1)}.$$

16. The method of claim 10, further comprising:
checking, by the controller, whether a navigation-based smart cruise control (NSCC) function is operated after detecting the deceleration event; and
determining that a control speed value during smart cruise control is the expected speed of the vehicle at the deceleration event point when the NSCC function is operated.

17. The method of claim 10, further comprising:
capturing, by a camera, an image of a forward side of the vehicle;
displaying, by a display controller, the received expected speed of the vehicle in the form of the augmented reality (AR) image; and
displaying, by a projector, the AR image indicating the position of the deceleration event and the expected speed of the vehicle on the information display screen using information on the image of the forward side of the vehicle according to a command signal of the display controller.

18. The method of claim 17, further comprising:
identifying, by the display controller, the deceleration event from the image of the forward side of the vehicle to determine the position of the deceleration event;
determining a region of a road, in which the vehicle is to be positioned when the vehicle reaches a forward deceleration event point from the image of the forward side of the vehicle, based on the determined position of the forward deceleration event; and
displaying the determined region of the road of the vehicle on the information display screen through the projector.

19. The method of claim 17, further comprising:
when the expected speed of the vehicle at the deceleration event point is compared with a speed limit of the deceleration event information and speed of the vehicle at the deceleration event point is predicted, displaying, by the display controller, a warning on the information display screen through the projector.

20. The method of claim 10, wherein the deceleration event is a speed limit camera or a speed limit section with a prescribed speed limit.

* * * * *